Patented July 10, 1928.

1,676,437

UNITED STATES PATENT OFFICE.

ARTHUR PENNOYER HARRISON, OF YONKERS, NEW YORK, ASSIGNOR TO THE FLEISCHMANN COMPANY, OF NEW YORK, N. Y., A CORPORATION OF OHIO.

PROCESS FOR THE MANUFACTURE OF YEAST.

No Drawing.  Application filed October 19, 1925. Serial No. 63,448.

This invention relates to the manufacture of yeast, especially bakers' yeast and more particularly to an improved method of carrying out a process of manufacturing yeast in which the addition of nutrients and the withdrawal of yeast of high quality may be carried on intermittently for considerable periods of time.

An object of this invention is to provide an improved procedure for the manufacture of yeast in an efficient, convenient and economical manner, whereby the effective yeast producing capacity of fermenters and other propagating apparatus is materially increased.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

The process typified by the present invention is adapted to the manufacture of yeast from any suitable yeast nutrient solutions such as, for example, those prepared either from cereal materials or by artificially compounding or preparing a nutrient solution containing the desired nutrients by the regulated and controlled admixture of suitable sugar materials, such as molasses or the like, with yeast nutrient salts adapted to supply yeast-assimilable nitrogen, phosphorus and the like to the yeast during propagation. Such nutrient solutions are usually prepared in a manner such that the resultant density thereof is about 10° to 15° Balling, although obviously, as will hereinafter appear, the density may vary considerably, it being only necessary to compensate therefor by the regulated addition of water or other suitable diluent, in the required amounts.

After the desired nutrient solution has been prepared, a portion thereof is run into a suitable fermenter equipped with means for aeration and temperature control and is diluted to a suitable degree, as, for example, to about 1° to 2° Balling; aeration is commenced, and the seed or stock yeast is added. The propagation of the yeast in this portion of the nutrient solution is then continued until the density of the nutrient solution has dropped to a point such that an approximately constant Balling is obtained.

In the use of a nutrient solution prepared from molasses, for example, and with a fermenter of the usual size, a suitable amount of nutrient solution for use in the present process has been found to be that which corresponds to about 1000 pounds or more of molasses. Sufficient water is then added to this solution to reduce the Balling thereof to about 1° to 2° Balling, the temperature is adjusted to from 30° to 33° C., and from 800 to 1000 pounds of seed yeast (comprising 80% to 100% of the initial molasses) is added. The aeration is carried on in the usual manner for about 2 hours, more or less, until a constant Balling of, for example, from 0.6° to 1.0° results.

At this point of the process, a suitable portion of, for example, about ½ more or less of the yeast-containing liquid is rapidly withdrawn and sent to the yeast separators where the yeast may be separated and subsequently pressed and packed in the usual manner. To the remaining propagating liquid in the fermenter there are then added further amounts of yeast nutrients including a sufficient amount of a previously prepared and relatively concentrated yeast nutrient solution, with or without the addition of requisite amount of suitably tempered water, to restore approximately the conditions of volume, density and temperature which were initially present in the fermenter. A second stage of the propagation is then carried on until the Balling of the nutrient solution has again become constant, whereupon the withdrawal of the yeast-containing liquid and the replenishment of the nutrient solution is again accomplished in the manner above set forth.

The amounts of seed yeast and nutrient solution used, and the time of withdrawal or amount of yeast-containing liquid withdrawn are so regulated that the yeast contained in the propagating liquid which is left in the fermenter at the end of any withdrawal stage is approximately that required for the proper seeding of the next succeeding stage of propagation. It will thus be seen that the cyclic operation of the intermittent process may be continued without interruption as long as the stability of the yeast remains unimpaired. In order to aid in the maintenance of the stability of the yeast, if desired, small amounts of new seed yeast, as for example, about 2% of the newly added nutrients (on a basis of molasses or 50% sugar materials) may be added at the beginning of a stage of propagation.

It has been found that the process carried out in accordance with the present invention may be continued for from one to several days without impairment of the quality of the yeast and with the production of high yields. It is apparent, therefore, that the percentage of seed yeast, on the basis of total nutrients used is inversely proportional to the total duration of the propagation period and it has been found that in a usual run of from one to two days' length, the amount of seed yeast necessary, ranges from about five to fifteen percent.

In the carrying out of the present process any of the usual operations of control of the acidity, temperature, etc., of the nutrient solution may be resorted to if desired. It is particularly to be noted, however, that even in the use of nutrient solutions containing inorganic salts of ammonia as a source of nitrogen, neutralization of released acidity is generally unnecessary for the reasons that the environment of any particular yeast cell is being substantially constantly changed and renewed, and the cell is subjected to the environment only for a relatively short period of time.

By the use of the present process a total yield of yeast of approximately 80% or over (on the basis of 50% fermentable sugars) may be obtained, such yeast having very desirable properties in that it presses well, is of a light color and has good keeping qualities and excellent baking strength. It will be observed that in the carrying out of the above process a large amount of materials can be passed through a fermenter in a given time with consequent saving in the amount of air and other ancillary materials and apparatus used for the production of yeast.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent, is:

1. A process of manufacturing yeast including the steps of propagating yeast in a fermenter with aeration in a yeast nutrient solution until said solution has reached an approximately constant Balling, withdrawing a portion of the yeast-containing liquid, restoring approximately the initial conditions of volume and density in the fermenter by the addition of yeast nutrient materials, and repeating the propagation with aeration.

2. A process of manufacturing yeast including the steps of propagating yeast in a fermenter with aeration in a yeast nutrient solution until said solution has reached an approximately constant Balling, withdrawing and separating a portion of the yeast-containing liquid, restoring approximately the initial conditions of volume, temperature, and density in the fermenter by the addition of yeast nutrient materials, and repeating the propagation with aeration.

3. A process of manufacturing yeast in cyclic operation which comprises propagating yeast in a fermenter with aeration in a yeast nutrient solution until said solution has reached an approximately constant Balling, withdrawing a portion of the yeast-containing liquid, restoring approximately the initial conditions of volume and density in the fermenter by the addition of yeast nutrient materials, and repeating the cyclic operation while retaining the stability of the yeast, by the fractional addition of seed yeast to the liquid in the fermenter.

4. A process of manufacturing yeast in cyclic operation which comprises preparing a yeast nutrient solution, initiating the propagation of yeast in a fermenter with aeration in a portion thereof diluted to about 2° Balling, continuing the propagation until the fermenting liquid has reached a constant Balling of approximately 0.8°, withdrawing a portion of the yeast-containing liquid, restoring approximately the initial conditions of volume and density in the fermenter by the addition of yeast nutrient materials, and repeating the cyclic operation while retaining the stability of the yeast, by the fractional addition of seed yeast to the liquid in the fermenter.

5. A process of manufacturing yeast in cyclic operation which comprises propagating yeast in a fermenter with aeration in a yeast nutrient solution until said solution has reached an approximately constant Balling, withdrawing a portion of the yeast containing liquid, restoring approximately the initial conditions of volume and density in the fermenter by the addition of yeast nutrient materials including sugar material, continuing the cyclic operation, and maintaining the stability of the yeast by the fractional addition of about 2% seed yeast (based on added 50% sugar materials) at approximately the beginning of each cycle.

6. A process of manufacturing yeast in cyclic operation which comprises preparing a yeast nutrient solution, initiating the propagation of yeast in a fermenter with aeration in a portion thereof diluted to about 2° Balling, continuing the propagation until the fermenting liquid has reached a constant Balling of approximately 0.8°, withdrawing a portion of the yeast-containing liquid, restoring approximately the initial conditions of volume and density in the fermenter by the addition of yeast nutrient materials including sugar material, repeating the cyclic operation, and maintaining the stability of the yeast by the fractional addition of about 2% seed yeast (based on added 50% sugar materials) at approximately the beginning of each cycle.

7. In a process of manufacturing yeast, the method of inducing yeast propagation in recurrent stages which comprises, as a first stage, initiating propagation with aeration in a fermenter which has been charged with a portion of previously prepared yeast nutrient solution diluted to about 2° Balling, and as a following stage, withdrawing yeast-containing liquid from said fermenter when said liquid has reached a constant Balling until there remains in the fermenter only sufficient yeast-containing liquid to seed a succeeding charge; and thereafter successively continuing propagations of the type of the last mentioned stage, the fermenter being recharged for each stage with a portion of said previously prepared yeast nutrient solution.

In testimony whereof I affix my signature.

ARTHUR PENNOYER HARRISON.